(12) United States Patent                        (10) Patent No.:     US 7,567,645 B2
     Baliga                                       (45) Date of Patent:     Jul. 28, 2009

(54) MODULAR INTEGRATED HEAD ASSEMBLY

(75) Inventor: Ravi Baliga, Danville, CA (US)

(73) Assignee: Advent Engineering Services, Inc., San Ramon, CA (US)

( * ) Notice: Subject to any disclaimer, the term of this patent is extended or adjusted under 35 U.S.C. 154(b) by 31 days.

(21) Appl. No.: 11/438,907

(22) Filed: May 22, 2006

(65) Prior Publication Data

US 2007/0140402 A1    Jun. 21, 2007

Related U.S. Application Data

(60) Provisional application No. 60/700,856, filed on Jul. 19, 2005.

(51) Int. Cl.
    *G21C 19/00* (2006.01)
(52) U.S. Cl. .................. 376/263; 376/260; 376/261; 376/287
(58) Field of Classification Search .............. 376/263, 376/261, 287
    See application file for complete search history.

(56) References Cited

U.S. PATENT DOCUMENTS

| | | |
|---|---|---|
| 3,937,651 A | 2/1976 | Schabert |
| 4,050,986 A | 9/1977 | Ference |
| 4,112,854 A | 9/1978 | Pitchford |
| 4,113,558 A | 9/1978 | Wade |
| 4,302,290 A | 11/1981 | Mazur |
| 4,427,621 A | 1/1984 | Gillett |
| 4,654,188 A | 3/1987 | Hankinson |
| 4,666,657 A | 5/1987 | Altman |
| 4,678,623 A | 7/1987 | Malandra |
| 4,828,789 A | 5/1989 | Hankinson |
| 4,830,814 A | 5/1989 | Altman |
| 5,069,143 A | 12/1991 | Bunger |
| 5,201,112 A | 4/1993 | Sevelinge |
| 5,225,150 A | 7/1993 | Malandra |
| 5,715,288 A | 2/1998 | Matteson |

(Continued)

FOREIGN PATENT DOCUMENTS

GB         2100496      * 12/1982

OTHER PUBLICATIONS

Merriam-Wbster's Collegiate Dictionary, Tenth Edition, p. 13.*

(Continued)

*Primary Examiner*—Rick Palabrica
(74) *Attorney, Agent, or Firm*—Christensen O'Connor Johnson Kindness PLLC (57) ABSTRACT

A two-part integrated head assembly (100) is disclosed wherein the lower portion (110) attaches to, and is supported by, the reactor vessel closure head (90), and the upper portion (160) is fluidly connected to the lower portion, but is supported externally from the reactor vessel closure head. In the disclosed embodiment, the upper portion includes transverse support beams (170) that engage containment walls (92), for example steam generator walls, to support the upper portion. A duct (150) releasably connects a fan plenum (165) in the upper portion with an annular plenum in the lower portion, such that fans (166) can draw heated air from around the CEDMs (95). In one embodiment, a chiller (168) is provided in the fan plenum to cool the air prior to expelling it in containment. A missile shield (169) is also provided in the upper portion.

19 Claims, 9 Drawing Sheets

U.S. PATENT DOCUMENTS

| | | | |
|---|---|---|---|
| 5,737,378 A | 4/1998 | Ballas | |
| 5,742,652 A | 4/1998 | Hankinson | |
| 5,930,321 A | 7/1999 | Harkness | |
| 5,999,584 A | 12/1999 | Adams | |
| 6,009,137 A | 12/1999 | Matsumoto | |
| 6,061,415 A | 5/2000 | Harkness | |
| 6,533,122 B1 | 3/2003 | Plunkett | |
| 6,546,066 B2 * | 4/2003 | Baliga et al. | 376/263 |
| 6,594,333 B2 * | 7/2003 | Kasahara et al. | 376/298 |
| 6,639,960 B2 * | 10/2003 | Harkness et al. | 376/260 |
| 7,158,605 B2 * | 1/2007 | Harkness et al. | 376/263 |

OTHER PUBLICATIONS

Ball, et al., "Plant Equipment Improvements for Outage Optimization," 13th Korean Atomic Industry Forum/Korean Nuclear Society Annual Conference, Seoul, Korea, Apr. 16, 1998, pp. 483-495.

Kim, et al., "Integrated Head Assembly for Korean Next Generation Reactor," Transactions of the 15th International Conference on Structural Mechanics in Reactor Technology, Seoul, Korea, Aug. 15-20, 1999, pp. XI-315-321.

Kim, T.-G., et al., "Introduction of the Integrated Head Package in the Reactor Vessel," in J.-Y. Yoo (ed.), "Power Engineering 35, Book 10, No. 2," Korea Power Engineering Co., Ltd., Yongin-Si, South Korea, Dec. 10, 1999, pp. 117-126 (English Translation).

* cited by examiner

MODULAR INTEGRATED HEAD ASSEMBLY

CROSS-REFERENCE TO RELATED APPLICATION

This application claims the benefit of U.S. Application No. 60/700,856, filed Jul. 19, 2005, which is incorporated herein by reference in its entirety.

FIELD OF THE INVENTION

The present invention relates to reactor vessel auxiliary equipment and, more particularly, to an assembly incorporating multiple systems disposed over a pressurized water reactors.

BACKGROUND OF THE INVENTION

In a typical commercial nuclear power plant such as a pressurized water reactor ("PWR"), a number of components and systems are installed on or directly over the reactor vessel closure head. These components and systems may include one or more of the following: a control element drive mechanism ("CEDM," also referred to as a control rod drive mechanism); a cooling system; a lift rig for the reactor vessel closure head; CEDM seismic restraints; and a CEDM missile shield. The components and systems are typically designed and installed individually to perform designated functions during plant operation.

It is well known that removal and subsequent re-installation of the reactor vessel closure head, including the requisite removal of various components disposed about the reactor vessel, is an expensive and time-consuming process. During refueling of the reactor, the installed components are generally disassembled from the reactor, removed and stored, to provide access to the reactor vessel closure head, so that the vessel head may be removed from the reactor vessel. The disassembled components are placed in designated storage areas, generally inside the reactor containment. Typically, in a commercial nuclear power plant, a lengthy series of steps or detailed procedures must be followed to safely remove external such equipment before the reactor vessel closure head is removed from the reactor vessel. The procedures that are performed prior to detensioning the reactor vessel closure head studs will generally include some or all of the following:

Removal and storage of heavy concrete missile shields;
Removal and storage of the CEDM cooling ducts;
Removal of the seismic restraints;
Disconnecting and storage of the CEDM power and rod position indicator cables;
Installation of the reactor head lifting rig tripod;
Removal of the cable trays and cables that extend from the reactor vessel closure head to the operating deck or walls;
Disconnecting the heated junction thermocouples, nuclear steam supply system instrumentation, monitoring system cables, and reactor head vent lines; and
Installation of temporary radiation shield blankets around the vessel closure head area.

The procedure also requires that the nuts and washers be removed from the reactor vessel closure head and placed in storage racks during preparation for refueling. The storage racks are then removed from the refueling cavity and stored at convenient locations inside containment prior to reactor vessel closure head removal and refueling cavity flooding. After refueling and any other desired servicing, the reactor vessel closure head is replaced, and the components and systems are reassembled, generally by reversing the steps mentioned above.

Each procedure in the refueling process contributes significantly to the total cost associated with refueling the reactor. The total costs include costs associated with personnel time required to perform the refueling, power plant down time and consequent loss of electricity production, radiation exposure to personnel, and risks and costs associated with potential human errors. In addition, the various components that must be removed for refueling activities require a large amount of the limited storage space available inside containment and raise the risk of inadvertent contamination of work and storage areas.

Concepts and designs for integrating some of the reactor vessel closure head systems into a modular integrated head design have been proposed. For example, in U.S. Pat. No. 4,678,623 to Malandra et al., a head assembly is disclosed wherein vertical lift rods are attached to the reactor vessel lifting lugs and a missile shield, seismic support platform, CRDM cooling system, and lift rig are supported by the lift rods above the reactor vessel closure head. Because most or all of the modular head assembly taught by Malandra et al. is supported by the lift rods, however, very large loads are concentrated at the clevis connection at the reactor vessel closure head lifting lugs, which may cause damage to the lifting lugs and/or the body of the reactor vessel closure head. In addition, very heavy components, such as the missile shield and the fans, are supported at the distal ends of three relatively long lift rods, resulting in an unstable structure that may subject the lift rods to undesirable compressive, bending, and torsional stresses. Malandra et al. also does not provide a structure for putting a shroud around the CRDMs.

In U.S. Pat. No. 4,830,814, Altman discloses an integrated head package having a missile shield that is slidably mounted near the distal end of three lift rods connecting to the reactor vessel closure head lifting lugs. A shroud is shown disposed about the CRDMs. Similar to the apparatus disclosed by Malandra et al., however, the heavy missile shield and lifting rig are installed at the distal end of three elongate lift rods that are connected at their proximal end to the reactor vessel closure head lifting lugs. The Altman apparatus, therefore, will also produce relatively high local loads in the reactor vessel lifting lugs and head. Altman also does not disclose any system for cooling the CRDMs.

In U.S. Pat. Nos. 6,546,066 and 6,618,460, which are hereby incorporated in their entirety, the present inventor discloses an improved integrated head assembly having a cylindrical shroud on a ring support mounted to the reactor vessel closure head. The disclosed integrated head assembly includes a forced air cooling system, missile shield, and seismic support system. The integrated head assembly is removable in a single lift. In some applications, however, it may be preferable to have at least portions of the head assembly supported separately from the reactor head, and/or to divide the lift for removing these systems into more than a single lift.

There remains a need, therefore, for an integrated head assembly for a pressurized water reactor that can be removed from the reactor vessel integrally with the reactor vessel closure head and that does not introduce undue local stresses at the reactor vessel closure head and lifting lugs.

SUMMARY OF THE INVENTION

A two-part integrated head assembly ("IHA") for a commercial nuclear reactor is disclosed. The two-part IHA relieves the loads on the reactor vessel, as compared with prior one-piece integrated head assemblies. For example, and not by way of limitation, it will be appreciated that the two-part integrated head assembly is particularly beneficial in reactor systems that do not incorporate load-transferring seismic tie rods on their service structures at the refueling floor elevation. A lower portion of the IHA attaches to the reactor vessel closure head, for example utilizing a ring beam that distributes the loads and lift rods that attach to lifting lugs on the reactor vessel closure head. The lower portion may include a shroud or outer wall the surrounds the control element drive mechanisms, and that define vertical air flow channels that fluidly connect to an annular plenum. A baffle system may also be provided to more predictably control the cooling air flow path. The upper portion includes vertical support beams, and horizontal support beams. The horizontal support beams engage auxiliary structure in containment, such as the steam generator walls, to support the upper portion of the IHA during use. When access to the interior of the reactor vessel is required, for example during refueling outages, the upper portion can be removed and moved to an alternate location for storage, and may be supported by the vertical support beams. In a preferred embodiment, the lower portion is removable as a unit with the reactor vessel closure head by disengaging the reactor vessel attachment hardware, and lifting the lift rods. Typically, the reactor vessel closure head and lower portion of the IHA may then be stored in a location typically reserved for the closure head.

In an embodiment of the IHA, the duct has a releasable and flexible joint for attachment to the annular plenum on the lower portion. Platforms and other access assemblies may also be provided on the upper portion. It is also contemplated that heat exchange equipment such as a chiller may be provided, most conveniently in the fan plenum, to cool the cooling air prior to expulsion into containment.

In an embodiment of the IHA, the upper portion includes a missile shield that is adapted to stop or hinder the expulsion of control elements and/or CEDMs during certain accident scenarios.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF A PREFERRED EMBODIMENT

In a typical light water pressurized water reactor ("PWR") design for commercial power generation, a number of individual components are assembled and located over the reactor vessel closure head inside the containment structure. These components generally must be disassembled for reactor refueling and then reassembled during every refueling outage. The disassembly and assembly procedures require a considerable amount of time and, in particular, require significant worker time inside containment. As a result, workers may receive significant radiation dosage.

To minimize the critical path time and radiation dosage during refueling outages, an integrated head assembly ("IHA") has been designed by the present inventor, and disclosed in U.S. Pat. Nos. 6,546,066 and 6,618,460, which are incorporated herein by reference. The one-piece IHA is assembled into a single unit and provides in a single mechanical assembly most or all primary head area components. The one-piece IHA is attached to the reactor vessel closure head, and permits access to the vessel head attachment hardware, permitting all of these components to be moved in a single lift. The IHA also provides a forced air convection system that improves the efficiency of the control rod drive mechanism/control element drive mechanism cooling ("CEDM"). The IHA saves a significant amount of critical path time and radiation dosage during refueling outages.

However, in some instances, integrating the various head area components, and including a more efficient CEDM cooling system, results in an IHA total weight that is greater than the total weight of the original head area components supported by the reactor vessel head in the original design. In some PWR designs—for example, in certain Westinghouse and Babcock & Wilcox PWRs—the weight of the IHA is supported in part by the reactor vessel and in part by the containment cavity walls (e.g., through seismic support structures). In other PWR designs—for example, in certain PWRs designed by Combustion Engineering—all of the weight of the single-piece IHA would be supported by the reactor vessel alone.

It will be appreciated by persons of skill in the art that any additional weight from an IHA on the reactor vessel and the containment walls requires additional evaluation of the reactor vessel, reactor coolant loop, and the containment walls. Generally, the load capacities of the concrete walls are significantly greater than the loads applied by the weight of the IHA on the concrete walls. A reevaluation of the loads on the reactor vessel and the reactor coolant loop is necessary to assure that the system meets all requirements in the commercial nuclear power industry. A two-part IHA has been designed, as disclosed herein, that does not require the reactor vessel to support the entire weight of the two-part IHA.

The two-part IHA disclosed herein does not require that the reactor vessel support significantly more weight than is currently supported in a typical conventional installation without an IHA, and preferably does not require that the reactor vessel support any more than the original head design load. In addition, in the two-part IHA disclosed herein, the two parts of the IHA can be removed sequentially, reducing the maximum weight that must be moved in any single lift. It will be appreciated by those of skill in the art that the present two-part IHA design may therefore eliminate any need for a polar crane upgrade.

Figure 1A:
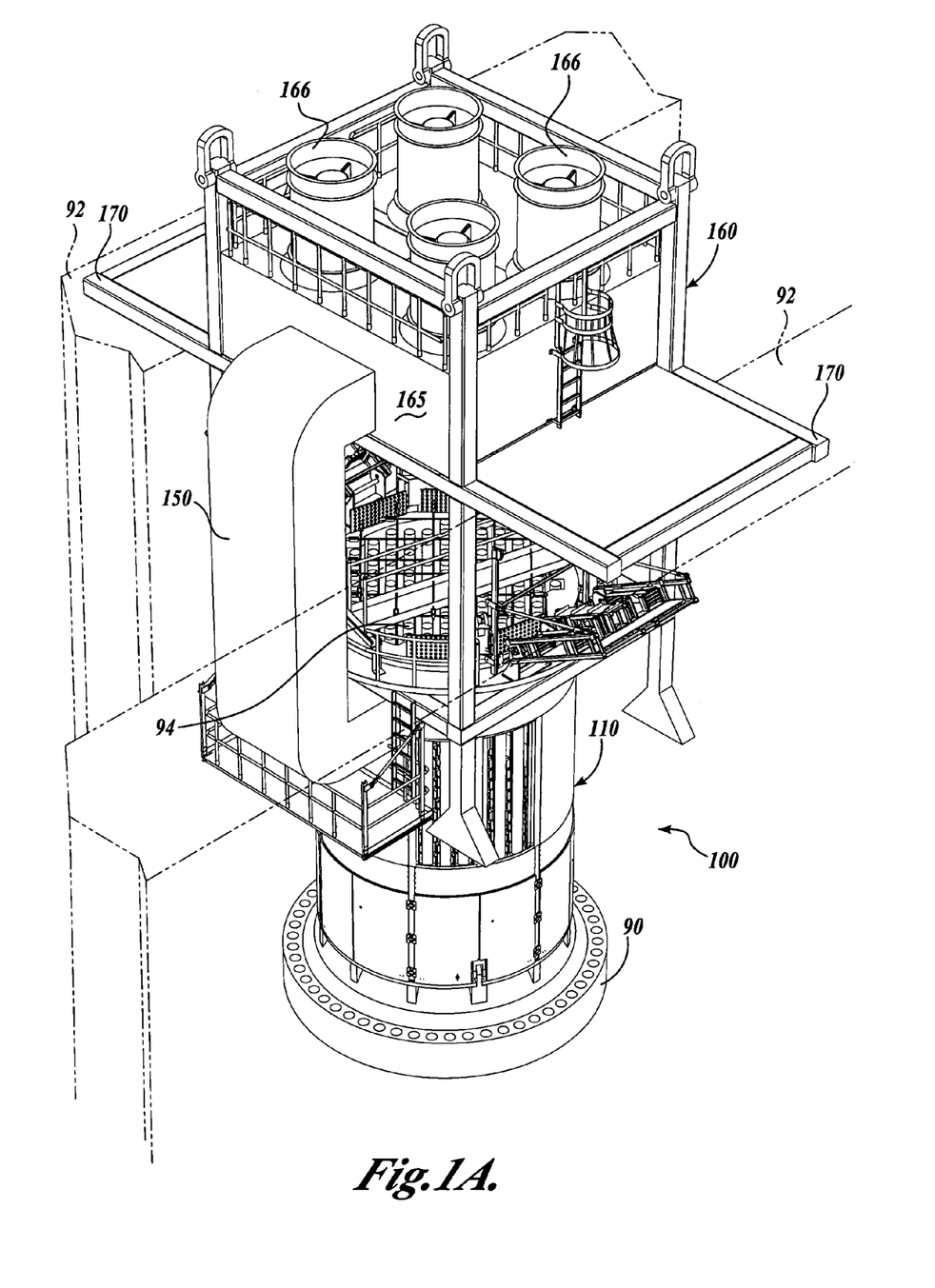
FIGS. 1A, 1B, and 1C are perspective environmental views of a two-part integrated head assembly in accordance with the present invention, FIG. 1C showing the integrated head assembly removed from the reactor vessel.
Figure 1B:
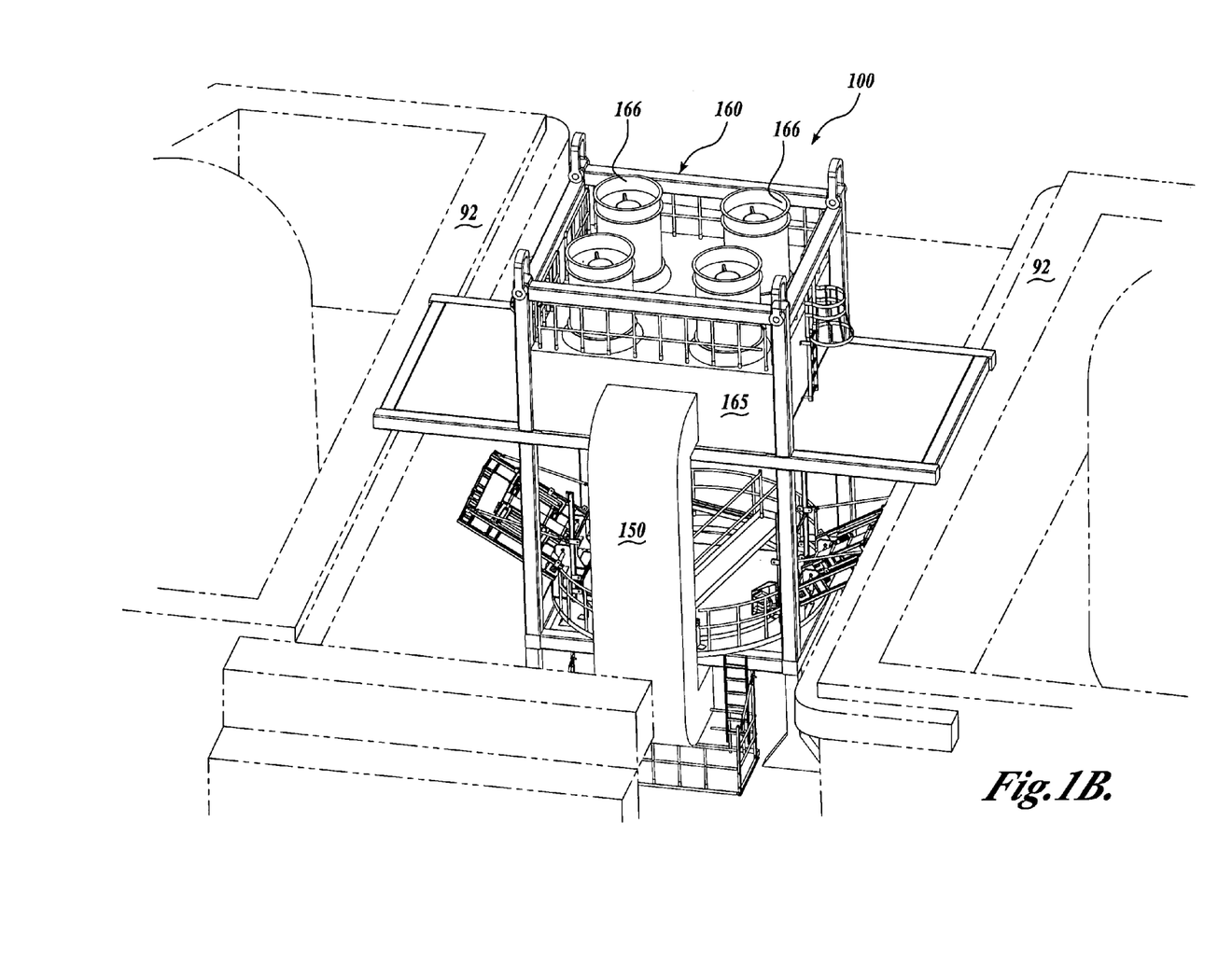
Figure 1C:
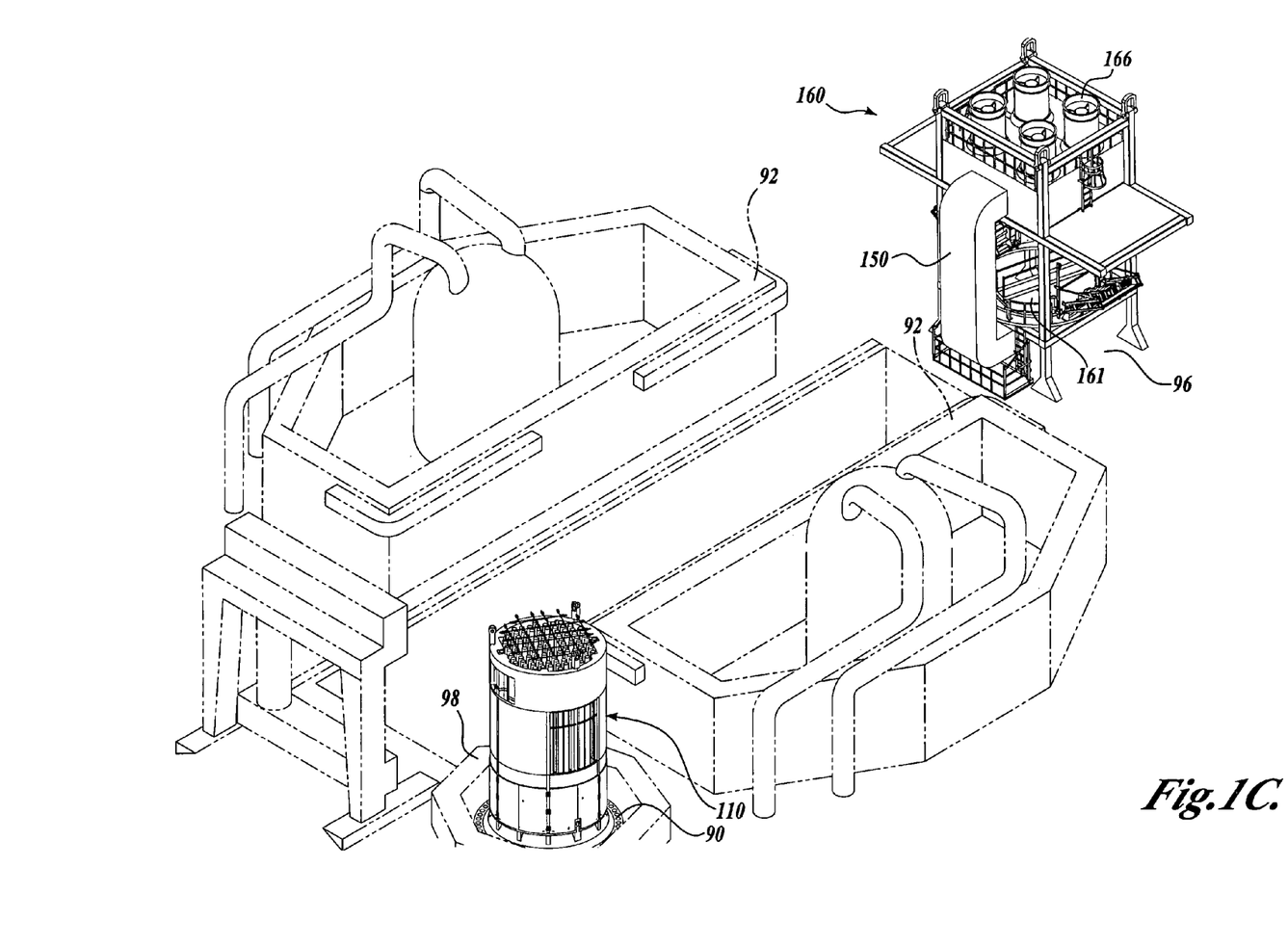
Figure 1D:
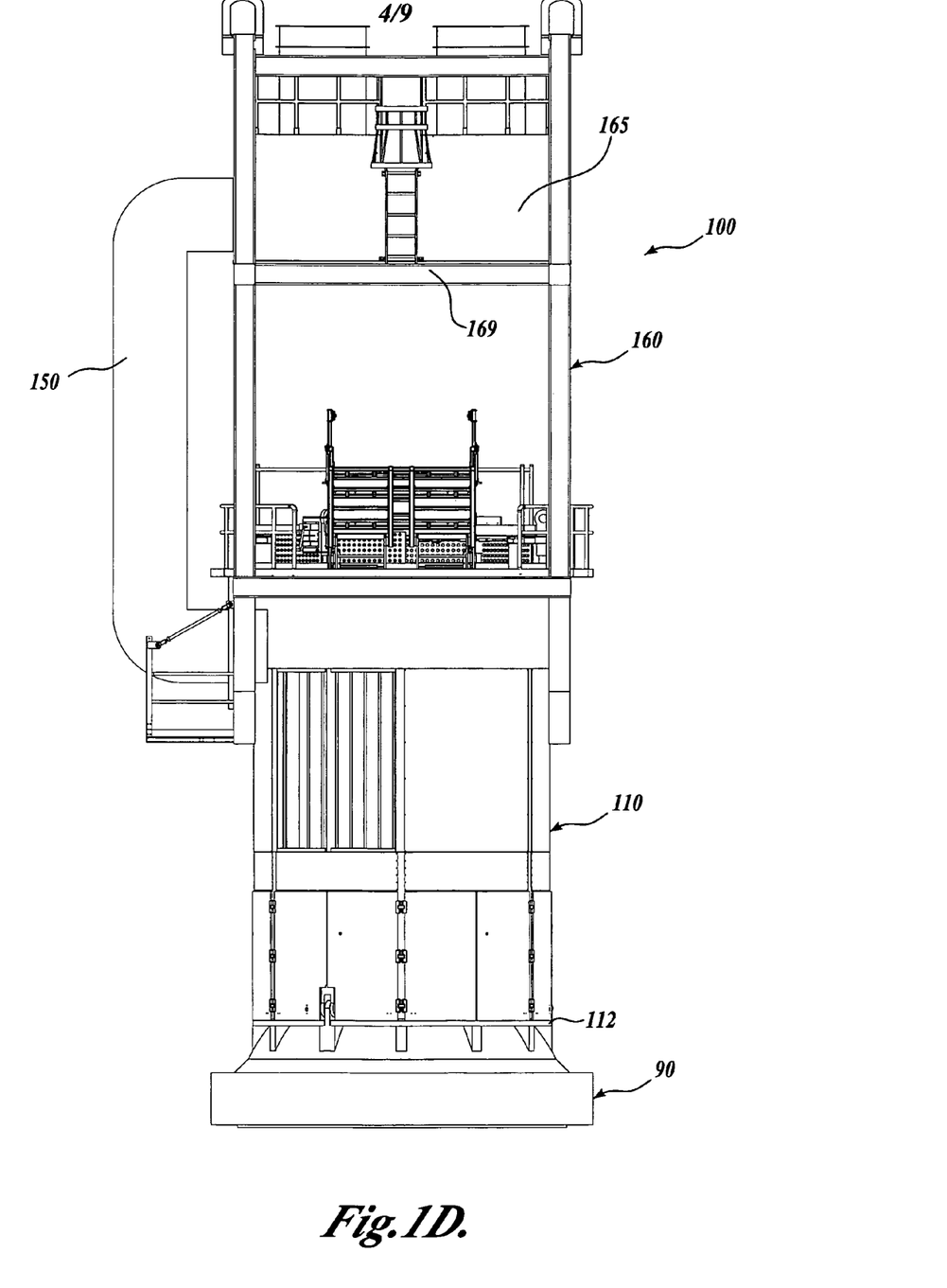
FIG. 1D shows a side view of the assembled, two-part integrated head assembly shown in FIG. 1A and mounted on a reactor vessel closure head.

Refer now to FIGS. 1A, 1B, 1C and 1D showing a currently-preferred embodiment of a two-part IHA 100 in accordance with the present invention. FIG. 1A shows the IHA 100 installed on a reactor vessel closure head 90; FIG. 1B shows a more detailed drawing of the assembled IHA 100; FIG. 1C shows the IHA 100 removed from the reactor vessel (not visible), with the upper portion 160 stored separate from the lower portion 110. A side view of the assembled IHA 100 is shown in FIG. 1D.

The two-part IHA 100 provides a shroud providing radiation shielding, and includes a forced air convective cooling system that directs air over the CEDMs to provide cooling as discussed in detail below, and a missile shield system for protecting against potential ejection of elements from the reactor in certain accident scenarios, also discussed below.

The two-part IHA 100 includes a generally cylindrical lower portion 110, having an outer wall portion that is disposed about, and shrouds the CEDMs 94. An upper portion 160 of the IHA 100 provides cooling components such as the fans 166, and a missile shield 169 (FIG. 3B), and includes an opening 161 (FIG. 1C) at its bottom end that is sized to accommodate the top end of the lower portion 110. A duct 150 extends between the lower portion 110 and the upper portion 160. The perimeter of the lower portion 110 is sized such that the lower portion 110 does not interfere with regular access to the attachment hardware for the reactor vessel closure head 90.

The weight of the upper portion 160 is preferably supported by concrete walls 92—for example, the steam generator walls (shown in phantom in FIG. 1A), or other suitable structure in the containment area around the reactor vessel. Persons of skill in the art will readily recognize that such concrete walls 92 are typically already present in the reactor containment, e.g., in some typical installations a concrete missile shield is supported by the concrete walls 92. The lower portion 110 is attached to and supported by the reactor vessel closure head 90. The lower portion 110 is substantially mechanically uncoupled from the upper portion 160—that is, the lower portion 110 does not support any substantial fraction of the weight of the upper portion 160 and the upper portion 160 does not support any substantial fraction of the weight of the lower portion 110. When the lower portion 110 and upper portion 160 are assembled and in use, they cooperatively provide efficient cooling for the CEDMs 94 (indicated schematically in FIG. 1A), and other typical IHA functions.

As shown in FIG. 1C, during outages that require the reactor vessel closure head 90 to be removed, the upper portion 160 of the IHA 100 is removed first and placed in a suitable location 96, typically within containment. The lower portion 110 of the IHA 100 is then removed, preferably with, and while still attached to, the reactor vessel closure head 90, and placed in a vessel head parking location 98.

Figure 2A:
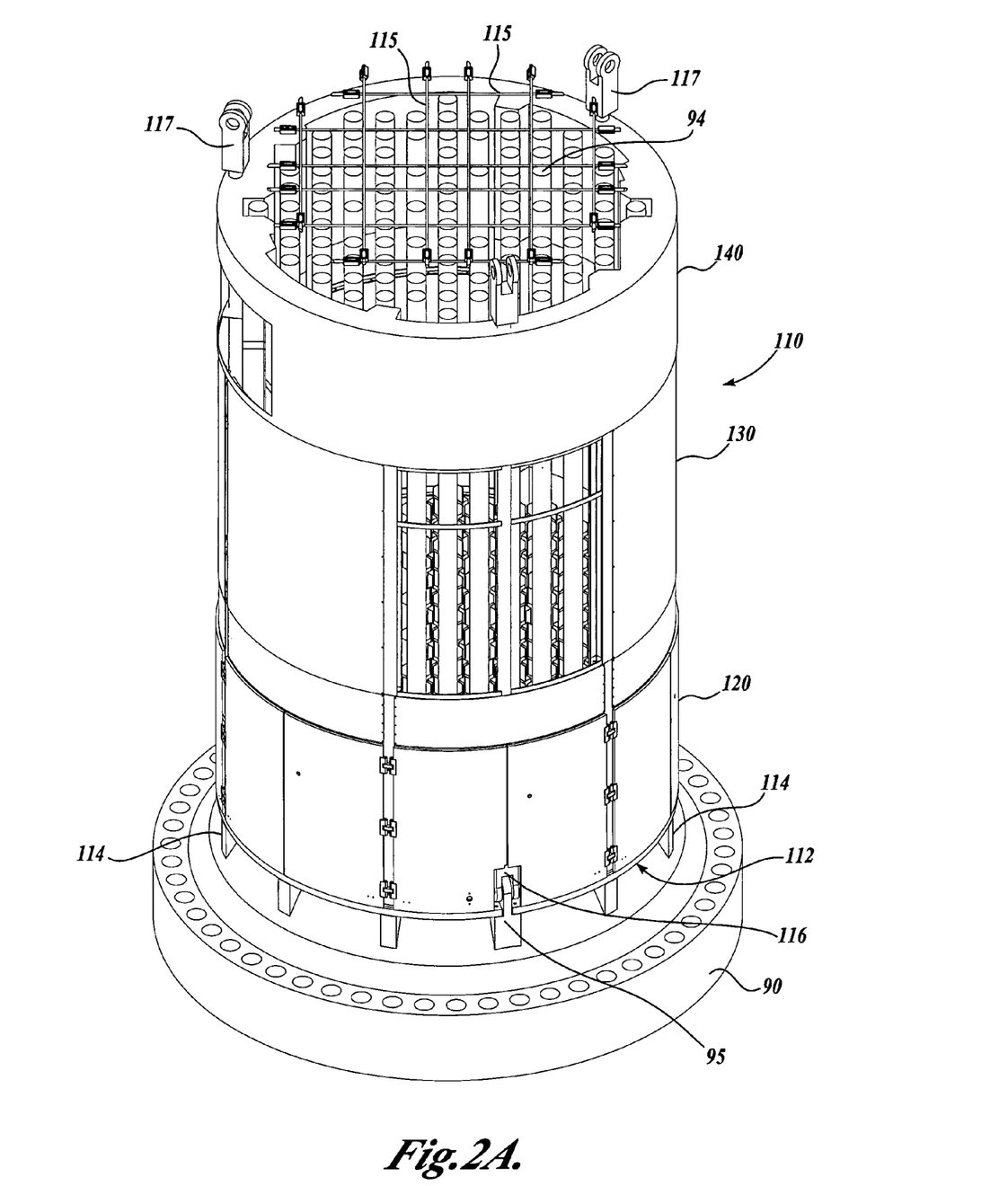
FIG. 2A is a perspective view of the lower portion of the integrated head assembly shown in FIG. 1A attached to a reactor vessel closure head.

FIG. 2A shows a perspective view of the lower portion 110 of the IHA 100 mounted on a reactor vessel closure head 90 with the CEDMs 94 extending upwardly, generally shrouded by the lower portion 110. An array of messenger wires 115 are shown disposed at the top of the lower portion 110, although it will be appreciated that messenger cables 115 may alternatively, or additionally, be provided on the upper portion 160. The lower portion 110 includes a ring beam 112 having a plurality of integral feet or saddle members 114 that approximately conform to the shape of the closure head 90. The ring beam 112 sits atop the closure head 90 and the saddle members 114 distribute the weight load on the closure head 90. The ring beam 112 engages lifting lugs 95 (one visible in FIG. 2A) formed in the closure head 90. A plurality of lifting rods 116 also engages the lifting lugs 95 and extends upwardly, generally terminating in a connector 117, the connectors 117 being adapted to engage a tripod (not shown) to facilitate lifting of the IHA lower portion 110 and closure head 90. A suitable ring beam is disclosed in U.S. Pat. No. 6,618,460 (incorporated by reference). In some embodiments of the present invention, particularly suitable for installations wherein the reactor vessel closure head 90 does not have lift lugs, the lifting rods 116 may attach directly to the ring beam 112.

In the preferred embodiment, the IHA lower portion 110 includes a bottom segment 120, a middle segment 130, and a top segment 140. The bottom segment 120 is supported by the ring beam 112. The middle segment 130 is attached to the bottom segment 120 and the top segment 140 is attached to the middle segment 130. The segments 120, 130, and 140 cooperatively define a generally cylindrical structure that shrouds the CEDMs 94 and is small enough in diameter such that it does not interfere with tightening of the head bolts (not shown) on the top of the closure head 90. Although the three-segment construction of the IHA lower portion 110 is currently preferred, it is contemplated that the lower portion may alternatively be constructed in one segment, two segments, or more than three segments, without departing from the present disclosure.

Figure 2B:
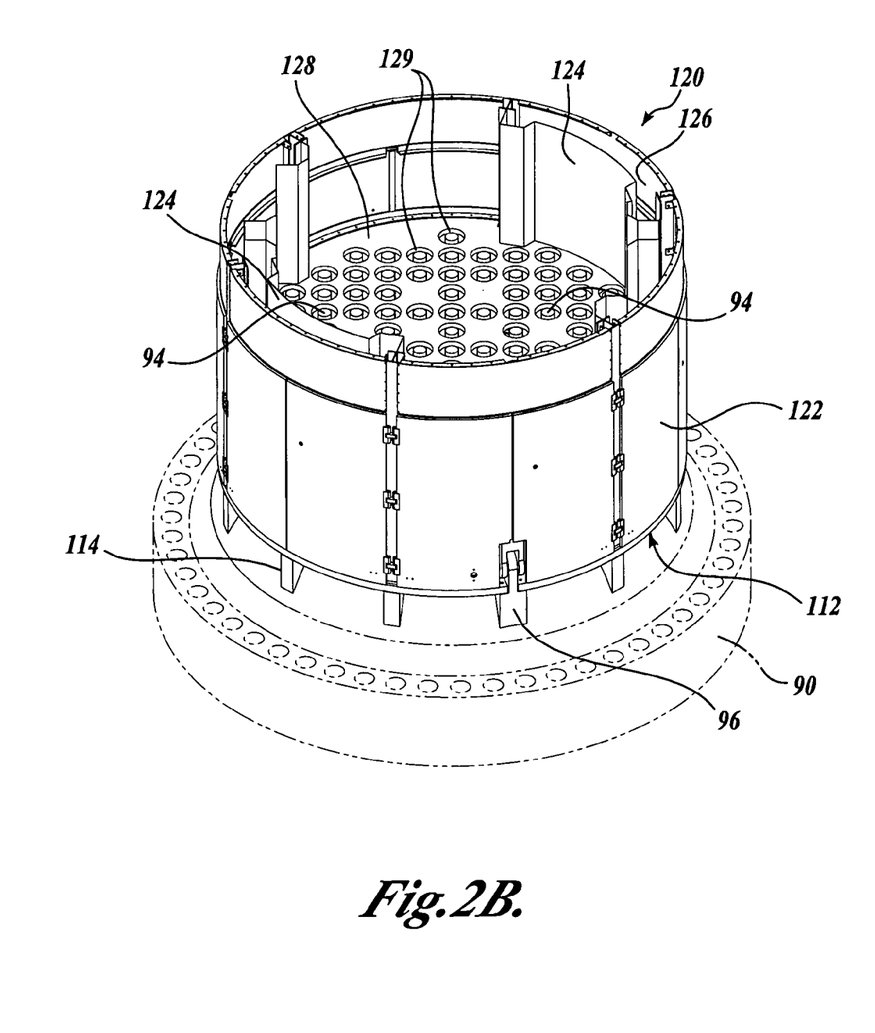
FIGS. 2B, 2C, and 2D show perspective views of the bottom, middle, and top segments, respectively, of the lower portion of the integrated head assembly shown in FIG. 1A.

FIG. 2B shows the bottom segment 120 of the IHA lower portion 110, attached to the reactor vessel closure head 90 (shown in phantom), with the ring beam 112. The bottom segment 120 includes an outer wall 122 and two inner walls 124, each inner wall 124 defining cooperatively with the outer wall 122 a substantially vertical channel 126 that is open at the top and bottom. A plate 128 having a plurality of apertures 129 sized and positioned to accommodate the CEDMs 94 extends horizontally across the bottom segment 120 at an intermediate elevation.

Figure 2C:
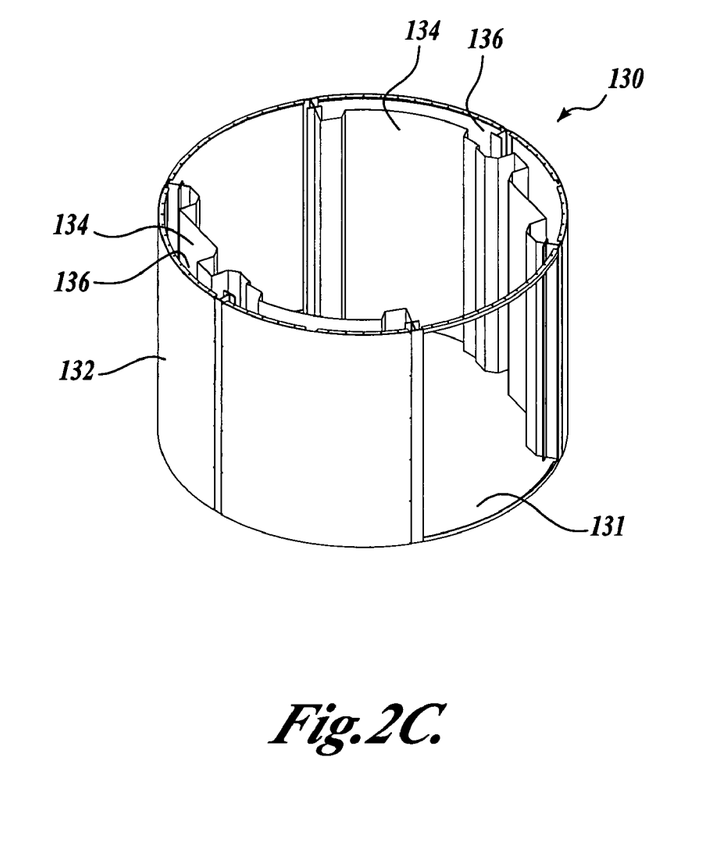

FIG. 2C shows the middle segment 130 in isolation. The middle segment 130 includes an outer wall 132 and two inner walls 134, each inner wall 134 defining cooperatively with the outer wall 132 a substantially vertical channel 136 that is sized and positioned to substantially align with and continue the channels 126 in the bottom segment 120. The middle segment includes one or more air inlet ports 131 that may include a closable door (not shown) for providing air flow into the lower portion 110.

Figure 2D:
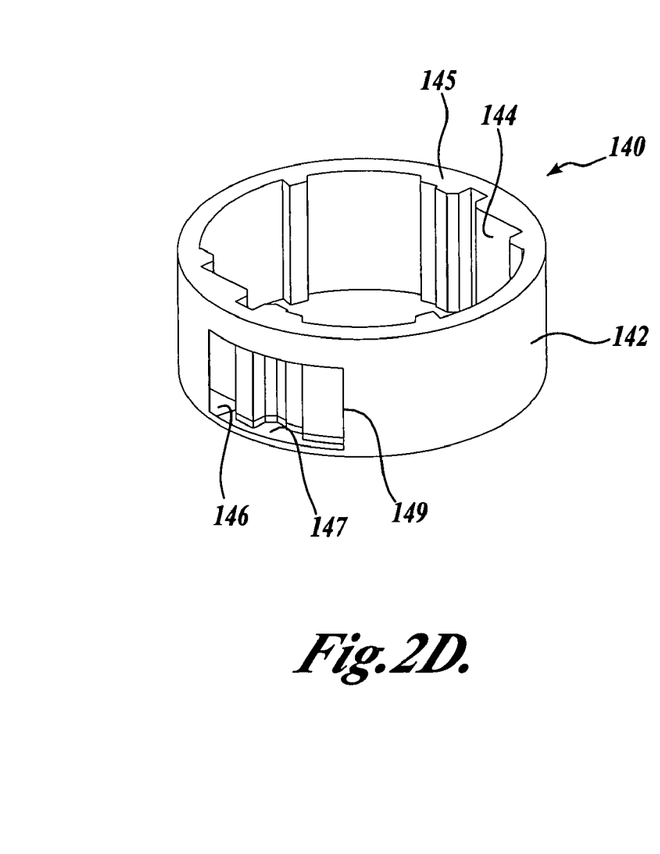

FIG. 2D shows the top segment 140 in isolation. The top segment 140 includes an outer wall 142 and an inner wall 144. The outer wall 142 and inner wall 144 are closed at the top 145 and partially closed at the bottom 146, the bottom 146 having downwardly facing ports or openings 147 (one visible in FIG. 2D) that are sized and positioned to match and continue the channel 136 in the middle section 130. The top segment 140, therefore defines a substantially annular plenum volume for the channels 136. An air outlet aperture 149 is also provided in the outer wall 142 that is adapted to engage the duct 150 to fluidly connect to the fan plenum 165 (see FIG. 1A), as discussed below.

Figure 3A:
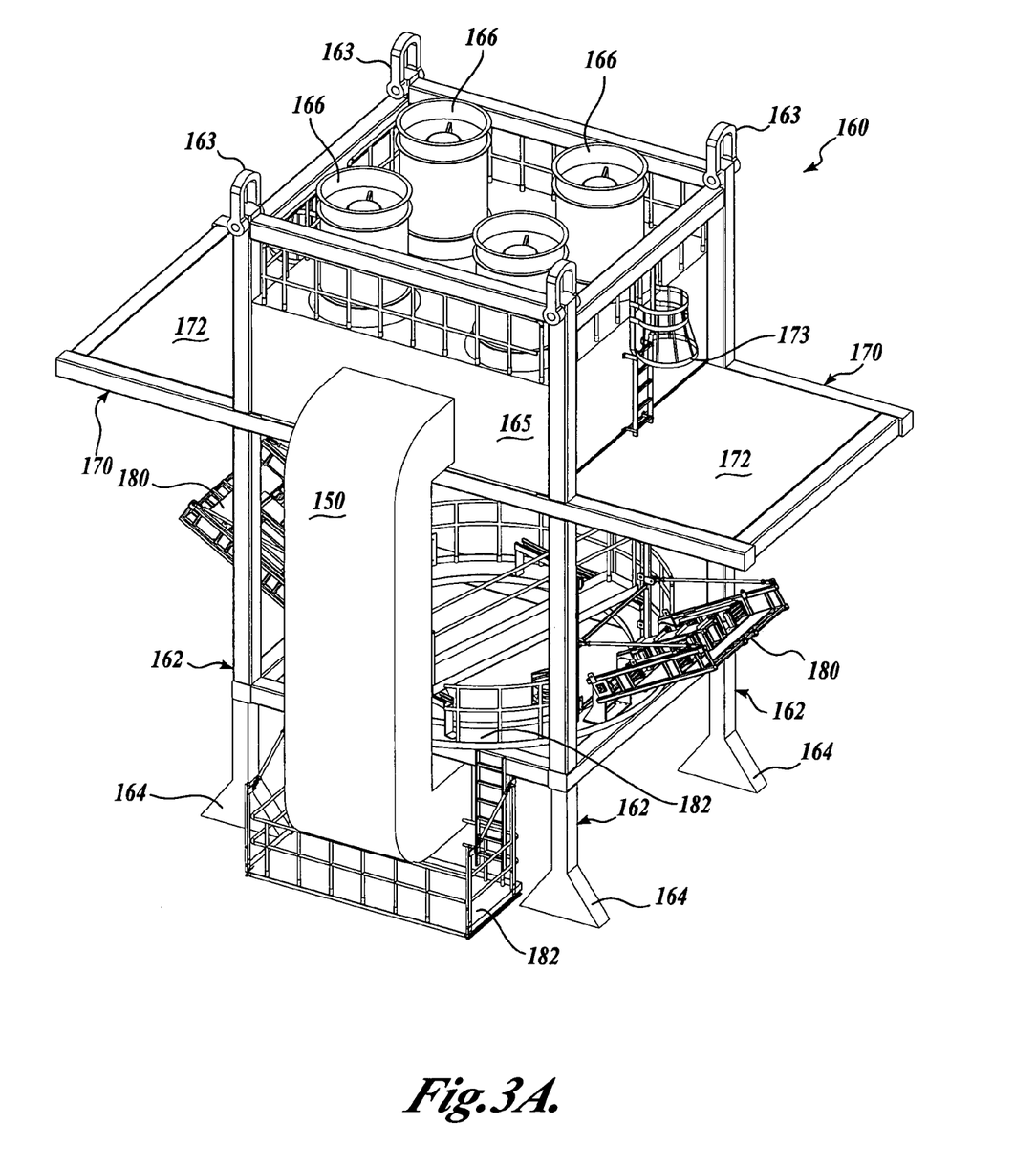
FIG. 3A shows a perspective view of the upper portion of the integrated head assembly shown in FIG. 1A.
Figure 3B:
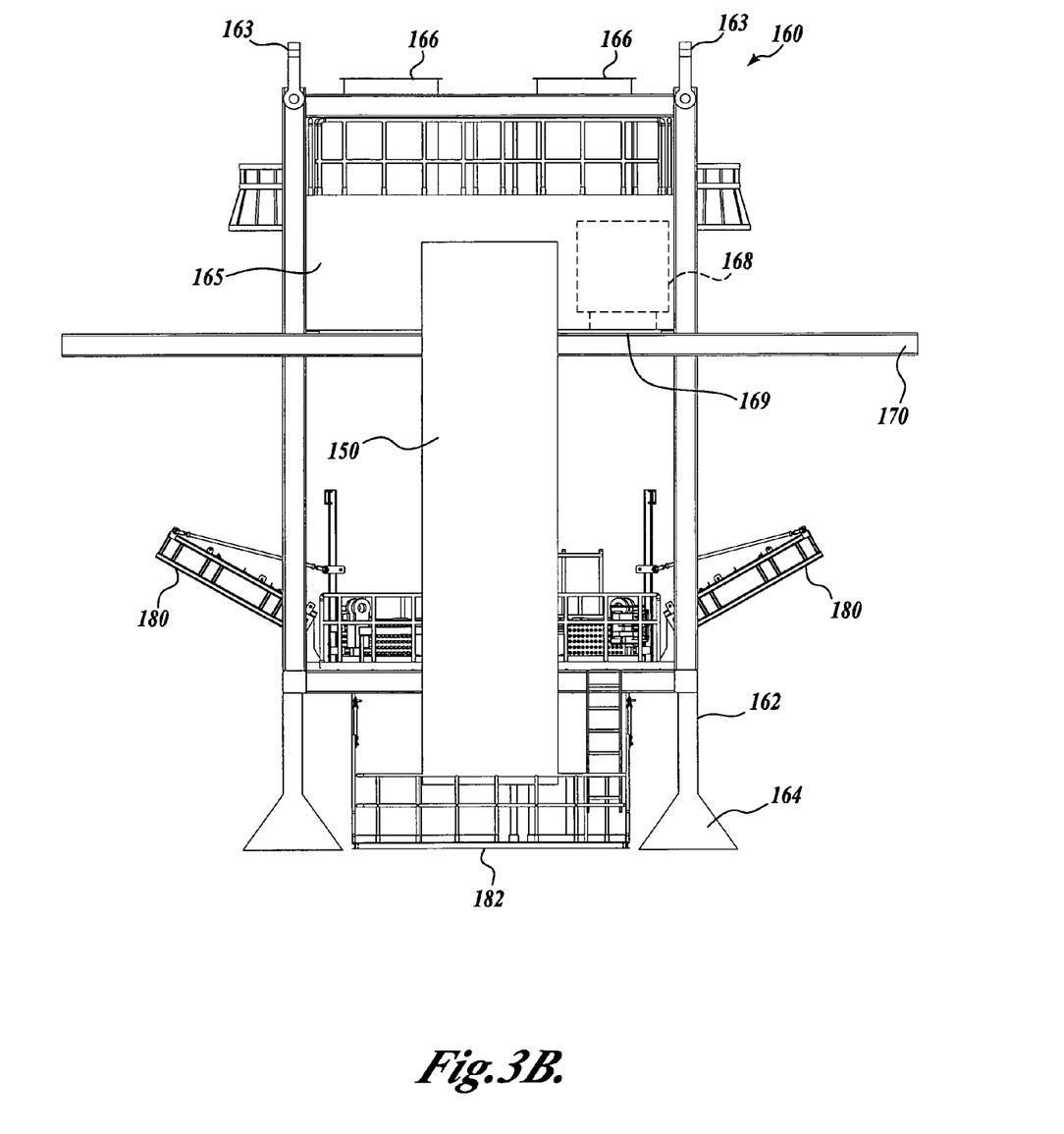
FIG. 3B shows a side view of the lower portion of the integrated head assembly shown in FIG. 1A.

Refer now to FIGS. 3A and 3B that show the upper portion 160 of the integrated head assembly 100 in isolation. The upper portion 160 includes four upright supports 162 having foot pads 164 at a lower end and lifting connectors 163 at an upper end. The lifting connectors 163 are preferably adapted to engage a tripod (not shown) to facilitate lifting of the IHA upper portion 160, to temporarily relocate the upper portion 160, for example during refueling outages.

The upright supports 162 engage a pair of transverse beams 170 that are adapted to extend between the concrete walls 92 (see FIG. 1A). The beams 170 are engineered to support the weight of the upper portion 160. As seen in FIG. 1C, the upright supports 162 are designed such that during outages the upper portion 160 can be set on a flat surface, supported by the upright supports 162. Optionally, horizontal plates 172 may be provided extending between the transverse beams 170, to define a platform, and ancillary access structures 173, to facilitate access to the upper portion 160.

The upper portion 160 further comprises a fan plenum 165 fluidly connecting a plurality of fans 166 (four shown) that are oriented to draw air upwardly through the plenum 165. The fan plenum 165 is connectable via the duct 150 to the plenum defined in the top segment 140 of the lower portion 110, as discussed above.

The upper portion 160 may further include cable supports and bridges 180, and additional work platform(s) 182. In a preferred embodiment, a missile shield 169 is incorporated into, or attached to, the fan plenum 165, wherein the missile shield 169 is defined to be a structure engineered to hinder or protect against the potential ejection of control elements, control element drive mechanisms, or the like in certain overpressure accident scenarios.

In a preferred embodiment, the duct 165 is releasably attached to the air outlet aperture 149 in the lower portion 110 of the IHA 100 by means of a flexible joint so that no significant load from the duct 165 will be transmitted to the lower portion 110 of the IHA 110.

The cooling air flow path for the currently preferred integrated head assembly 100 can now be appreciated. The fans 166 draw air through the fan plenum 165, through the duct 150, through the channels defined by the bottom segment 120, middle segment 130 and top segment 140 of the lower portion 110, and in through the air inlet port 131, such that the air flows about the CEDMs to remove excess heat prior to being drawn to the fan plenum 165. It is contemplated that the fan plenum 165 may include chillers 168 (FIG. 3B) or other supplemental heat exchangers to cool the circulated air prior to expelling the air back into the containment building. In one contemplated embodiment the chillers 168 are plumbed to an external cold water source (not shown). It will also be appreciated that the lower portion 110 may include baffles to more efficiently direct the air about the CEDMs. A suitable baffle structure is disclosed in the incorporated U.S. Pat. No. 6,618,460.

Some advantages of the two-part IHA 100 disclosed herein are as follows:

1. The lower portion 110 of the two-part IHA 100 provides features that are provided by prior IHAs. For example, the shrouding function of the lower portion 110 provides radiation protection. The lower portion may include inspection doors, and/or means for providing easy access to the dome insulation; easy access to the CEDM nozzles; and/or easy access to other reactor vessel systems such as the reactor vessel level indicator system ("RVLIS"), the core exit thermocouple system ("CET"), the reactor vessel head vent system ("RVHVS"), and the heated junction thermocouple system ("HJTC"). The two-part IHA 100 provides a modified and improved CEDM cooling system. It is contemplated that the two-part IHA may incorporate CEDM seismic support and tie rods, in particular for certain Westinghouse and B & W-designed PWRs.

2. The design of the lower portion 110 of the two-part IHA 100 may preferably be optimized such that the total weight of the lower portion is very close to the total weight of the originally designed reactor vessel head service structure. This will eliminate or reduce the need for any reevaluation of the reactor vessel and reactor coolant loop for added weight.

3. The upper portion 160 of the two-part IHA 100 provides features that are provided by prior one-part IHAs such as the missile shield assembly, and cooling equipment.

4. In the present design, an existing concrete missile shield in current containment structures may be removed or eliminated when using the present invention. The concrete missile shield generally weighs at least a few hundred thousand pounds and is typically supported by a concrete structure, for example steam generator walls. The total weight of the upper portion 160 of the two-part IHA 100 may be one-fourth (¼) to one-third (⅓) the weight of an existing concrete missile shield. Therefore, the concrete structure that is supporting the upper portion 160 of the IHA 100 will generally not require any structural modifications to take the loads from the upper portion 160 of the two-part IHA 100.

5. During refueling outage, the upper portion 160 of the two-part IHA 100 may be stored at the same location that the concrete missile shield is typically stored in current facilities. The lower portion 110 of the IHA 100 may be stored on the reactor vessel head stand. Therefore, the two-part IHA 100 is suitable for use in existing reactor installations, without requiring substantial modifications of the containment structure.

6. Since the lower portion 110 of the IHA 100 is intended to weigh approximately the same as the original head service structure, it is possible to reuse the existing lift rod and the tripod assemblies when the present invention is implemented as a modification or upgrade to an existing facility.

7. The upper portion 160 of the IHA 100 provides additional walkway(s) for workers to walk above the CEDMs in the middle of the lower portion 110 of the IHA 100. It also provides additional safety for workers while working on the CEDM inside containment.

8. The work platform(s) in the upper portion 160 of the IHA 100 may be located to provide easy access to disconnect the duct 150 from the lower portion 110 of the IHA 100.

9. The upper portion 160 of the IHA 100 provides an upper air plenum 165 that is large enough to provide one or more water chiller(s) 168 therein to cool the exhaust air from the CEDM cooling system prior to being ejected by cooling fans 166 into containment.

10. The upper air plenum 165 in the upper portion 160 of the IHA 100 provides additional space that may productively be used, for example allowing for the use of four cooling fans 166 compared to the prior art IHA designs that utilize only three cooling fans.

Other advantages and benefits of the two-part IHA 100 disclosed herein will be apparent to persons of skill in the art based on the present disclosure, and on the disclosure in patents that are incorporated herein by reference.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An integrated head assembly for a commercial nuclear reactor having a plurality of control element drive mechanisms and a reactor vessel closure head, the integrated head assembly comprising:
   a lower portion including hardware for attaching the lower portion to the nuclear reactor vessel closure head;
   a separable upper portion that is mechanically uncoupled from the lower portion when the lower portion and upper portion are assembled and in use and further comprises means for supporting substantially the entire weight of the upper portion over the lower portion such that the lower portion does not support any substantial portion of the weight of the upper portion during operation of the reactor;

a duct disposed externally of the upper portion and the lower portion, the duct extending from the upper portion to the lower portion; and a forced air cooling system attached to the upper portion and oriented to generate air flow about the control element drive mechanisms;

wherein the separable upper portion and the lower portion are configured to be removable separately during refueling outages; and further wherein the upper portion comprises a plurality of upright supports having footpads such that during storage the upper portion can be set on a flat surface and supported thereon by the upright supports.

2. The integrated head assembly of claim 1, wherein the lower portion further comprises a ring beam that is adapted to engage lifting lugs on the reactor vessel closure head.

3. The integrated head assembly of claim 2, wherein the lower portion further comprises a plurality of lifting rods that are attachable to the reactor vessel closure head such that the lower portion of the integrated head assembly and the reactor vessel closure head can be lifted as a unit.

4. The integrated head assembly of claim 1, wherein the lower portion includes a cylindrical wall and a transverse plate, and wherein the transverse plate has a plurality of apertures adapted to accommodate the plurality of control element drive mechanisms.

5. The integrated head assembly of claim 1, wherein the forced air cooling system comprises a plurality of fans fluidly connected to an upper plenum, wherein the fans are adapted to draw air over the control element drive mechanisms.

6. The integrated head assembly of claim 5, wherein the forced air cooling system further comprising a chiller disposed in the upper plenum that is operable to cool air in the upper plenum.

7. The integrated head assembly of claim 6 wherein the chiller is attached to an external cold water source.

8. The integrated head assembly of claim 1, wherein the means for supporting the weight of the upper portion over the lower portion comprises a plurality of horizontal beams adapted to support the weight of the upper portion during use.

9. The integrated head assembly of claim 1, wherein the upright structural supports include lifting connectors adapted to be engaged by a tripod assembly to facilitate moving the upper portion.

10. The integrated head assembly of claim 1, further comprising a plate attached to the horizontal beams to define an access platform.

11. The integrated head assembly of claim 5, wherein the lower portion further comprises a lower plenum, and wherein the duct fluidly connects the lower plenum with the upper plenum.

12. The integrated head assembly of claim 11 wherein the duct comprises a lower end having a flexible joint that is releasably attachable to the lower plenum such that no significant loads are transmitted by the duct to the lower portion of the integrated head assembly.

13. An integrated head assembly for a nuclear reactor disposed in a containment between first and second containment walls, the integrated head assembly comprising:

a lower portion including hardware for attachment to the nuclear reactor, the lower portion having an annular plenum;

a separable upper portion disposed directly over the lower portion that is mechanically uncoupled from the lower portion when the lower portion and upper portion are assembled and in use such that the lower portion does not support any substantial portion of the weight of the upper portion during operation of the reactor, and having a plurality of outwardly extending support beams such that substantially the entire weight of the upper portion is supportable by the support beams, the upper portion further including at least one fan fluidly connected to a fan plenum and a plurality of upright supports having footpads at a lower end, the upright supports engaging the outwardly extending support beams; and a duct fluidly connecting the annular plenum of the lower portion with the fan plenum of the upper portion, the duct being disposed externally of the upper portion and the lower portion, and further being releasably attached to at least one of the upper portion and the lower portion;

wherein the separable upper portion can be lifted away from the lower portion when the duct is disconnected from one of the upper portion and the lower portion and set on a flat surface and supported thereon by the upright supports.

14. The integrated head assembly of claim 13, wherein the upper portion further comprises a missile shield.

15. The integrated head assembly of claim 14, wherein the lower portion includes a ring beam that is attachable to the nuclear reactor.

16. The integrated head assembly of claim 15, wherein the ring beam further comprises a plurality of saddle members that distribute the load on the nuclear reactor.

17. The integrated head assembly of claim 13, wherein the lower portion further comprises at least one vertical channel to the annular plenum for cooling air flow.

18. The integrated assembly of claim 15, wherein the lower portion includes an air outlet aperture to the annular plenum, and the fan plenum includes an air inlet aperture, and wherein the plurality of fans are adapted to draw air from inside the lower portion, through the at least one vertical channel, to the annular plenum, and through the duct into the fan plenum.

19. The integrated assembly of claim 18, further comprising a chiller disposed in the fan plenum.

* * * * *